US012596356B2

(12) United States Patent
Zope et al.

(10) Patent No.: US 12,596,356 B2
(45) Date of Patent: Apr. 7, 2026

(54) METHOD AND SYSTEM FOR LOCALIZATION OF FAULTS IN AN INDUSTRIAL MANUFACTURING PLANT

(71) Applicant: Tata Consultancy Services Limited, Mumbai (IN)

(72) Inventors: Kalyani Bharat Zope, Pune (IN); Kuldeep Singh, Pune (IN); Sri Harsha Nistala, Pune (IN); Venkataramana Runkana, Pune (IN); Tanmaya Singhal, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 413 days.

(21) Appl. No.: 18/457,481

(22) Filed: Aug. 29, 2023

(65) Prior Publication Data
US 2024/0152123 A1 May 9, 2024

(30) Foreign Application Priority Data
Oct. 28, 2022 (IN) .............................. 202221061480

(51) Int. Cl.
*G05B 19/418* (2006.01)
(52) U.S. Cl.
CPC ..... *G05B 19/4184* (2013.01); *G05B 19/4183* (2013.01); *G05B 19/41885* (2013.01)
(58) Field of Classification Search
None
See application file for complete search history.

(56) References Cited

U.S. PATENT DOCUMENTS 9,582,618 B1 * 2/2017 Doraiswami ........... G06F 30/20
2022/0107630 A1 * 4/2022 Zope ..................... G06F 18/231

OTHER PUBLICATIONS

Kourti, Theodora, and John F. MacGregor. "Process analysis, monitoring and diagnosis, using multivariate projection methods." Chemometrics and intelligent laboratory systems 28, No. 1 (1995): 3-21. (Year: 1995).*
Breiman, Leo. "Random forests." Machine learning 45, No. 1 (2001): 5-32. (Year: 2001).*
Lundberg, Scott M., and Su-In Lee. "A unified approach to interpreting model predictions." Advances in neural information processing systems 30 (2017). (Year: 2017).*
(Continued)

*Primary Examiner* — Ryan A Jarrett
(74) *Attorney, Agent, or Firm* — Finnegan, Henderson, Farabow, Garrett & Dunner, LLP

(57) ABSTRACT

Existing systems for fault detection and classification have the disadvantage that they have limited or no capability for fault localization and root cause identification, probably due to the challenges associated with modeling the nonlinear interactions among process variables and capturing the nonstationary behavior that is typical of most industrial processes. The disclosure herein generally relates to industrial manufacturing systems, and, more particularly, to method and system for localization of faults in an industrial manufacturing plant. The system uses a perturbation based approach for fault localization, in which the system determines variables having dominant effect on identified faults, in terms of a perturbation score calculated for each of the variables.

20 Claims, 6 Drawing Sheets

(56)       References Cited

OTHER PUBLICATIONS

Tao Sun, Qi Wang, "Multi-source fault detection and diagnosis based on multi-level Knowledge Graph and Bayesian theory reasoning," International Conference on Software Engineering and Knowledge Engineering, 2019, http://ksiresearch.org/seke/seke19paper/seke19paper_64.pdf.

Stephanie Holly et al. "Autoencoder based Anomaly Detection and Explained Fault Localization in Industrial Cooling Systems," Proceedings of the 7th European Conference of the Prognostics and Health Management Society, 2022, http://ksiresearch.org/seke/seke19paper/seke19paper_64.pdf.

* cited by examiner

100

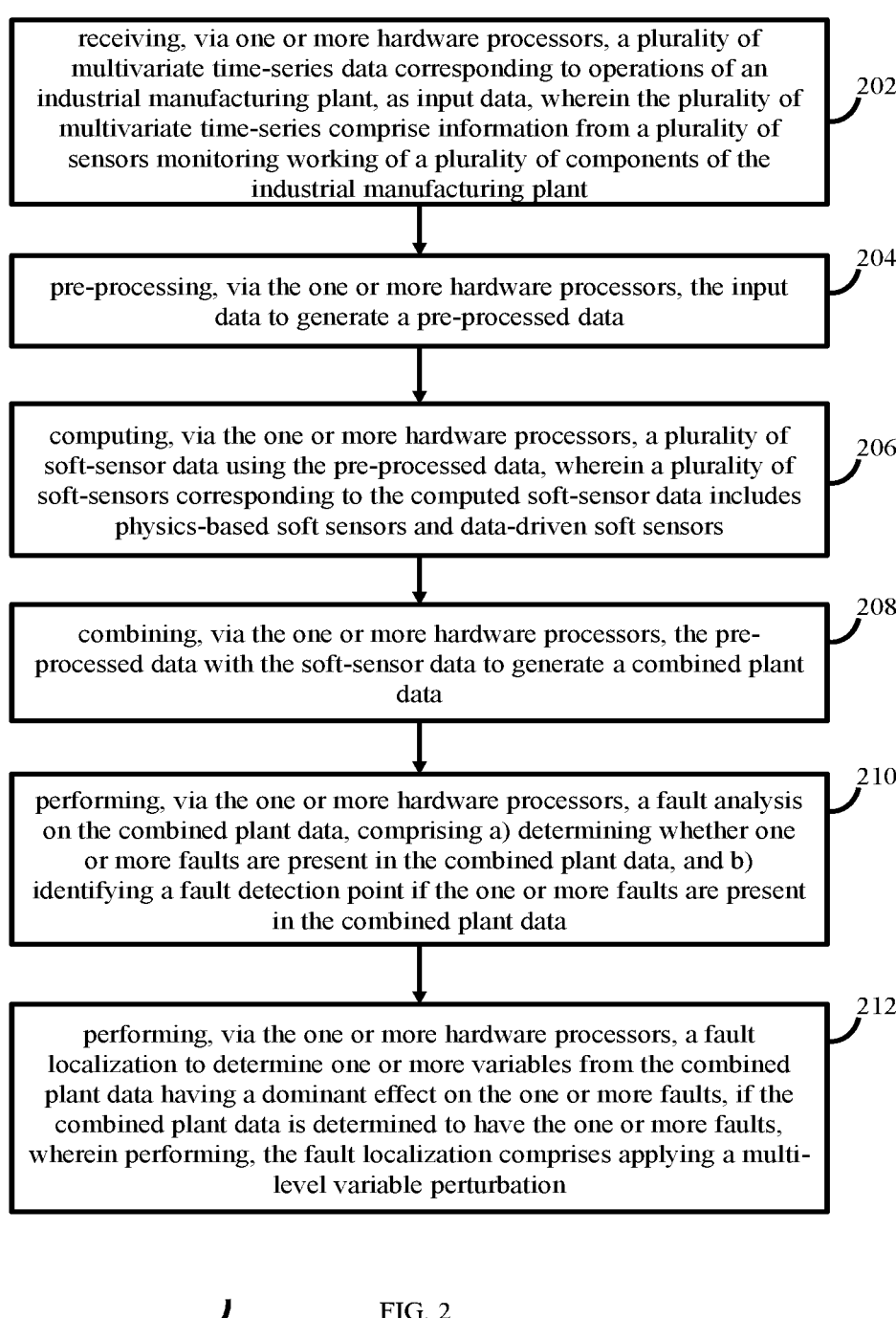

receiving, via one or more hardware processors, a plurality of multivariate time-series data corresponding to operations of an industrial manufacturing plant, as input data, wherein the plurality of multivariate time-series comprise information from a plurality of sensors monitoring working of a plurality of components of the industrial manufacturing plant — 202 pre-processing, via the one or more hardware processors, the input data to generate a pre-processed data — 204 computing, via the one or more hardware processors, a plurality of soft-sensor data using the pre-processed data, wherein a plurality of soft-sensors corresponding to the computed soft-sensor data includes physics-based soft sensors and data-driven soft sensors — 206 combining, via the one or more hardware processors, the pre-processed data with the soft-sensor data to generate a combined plant data — 208 performing, via the one or more hardware processors, a fault analysis on the combined plant data, comprising a) determining whether one or more faults are present in the combined plant data, and b) identifying a fault detection point if the one or more faults are present in the combined plant data — 210 performing, via the one or more hardware processors, a fault localization to determine one or more variables from the combined plant data having a dominant effect on the one or more faults, if the combined plant data is determined to have the one or more faults, wherein performing, the fault localization comprises applying a multi-level variable perturbation — 212

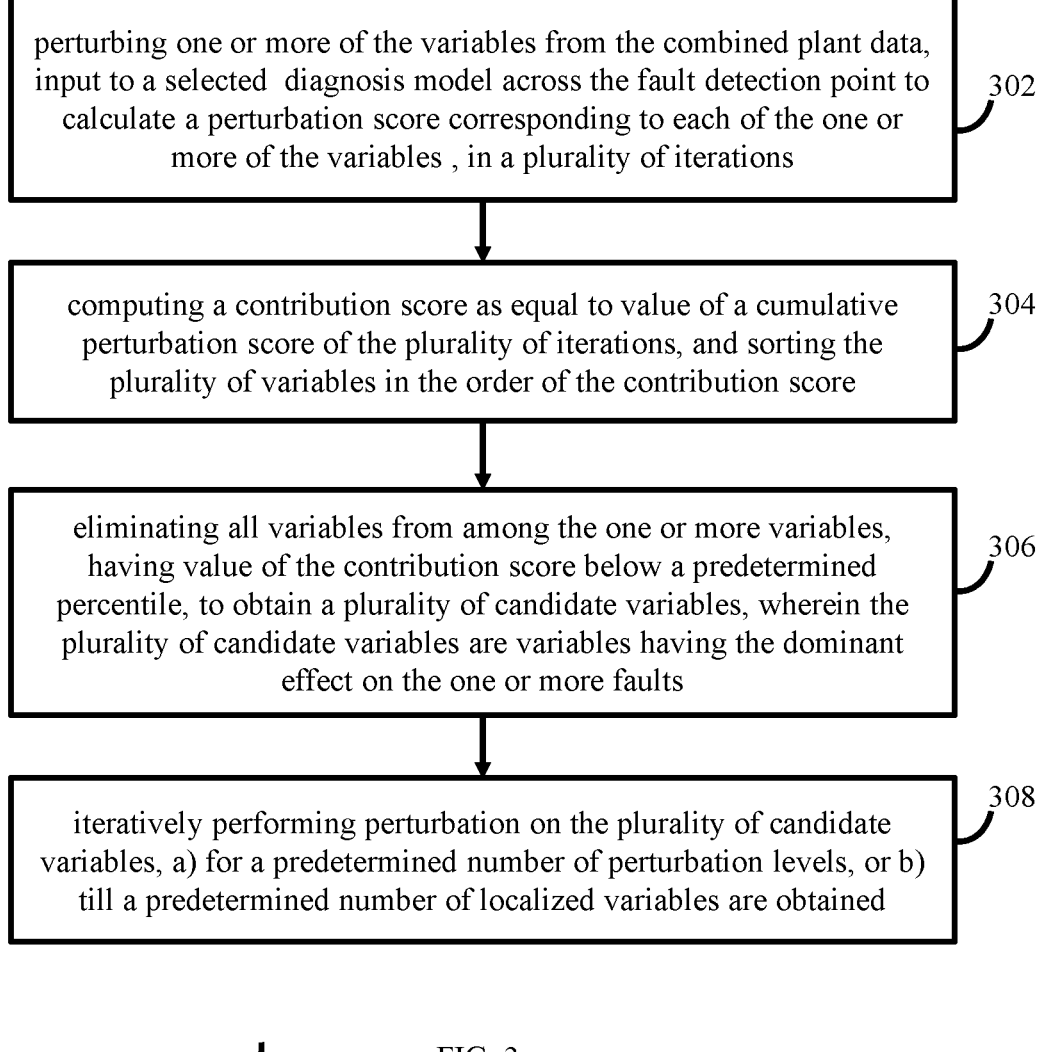

perturbing one or more of the variables from the combined plant data, input to a selected diagnosis model across the fault detection point to calculate a perturbation score corresponding to each of the one or more of the variables , in a plurality of iterations          302 computing a contribution score as equal to value of a cumulative perturbation score of the plurality of iterations, and sorting the plurality of variables in the order of the contribution score          304 eliminating all variables from among the one or more variables, having value of the contribution score below a predetermined percentile, to obtain a plurality of candidate variables, wherein the plurality of candidate variables are variables having the dominant effect on the one or more faults          306 iteratively performing perturbation on the plurality of candidate variables, a) for a predetermined number of perturbation levels, or b) till a predetermined number of localized variables are obtained          308

METHOD AND SYSTEM FOR LOCALIZATION OF FAULTS IN AN INDUSTRIAL MANUFACTURING PLANT

PRIORITY CLAIM

This U.S. patent application claims priority under 35 U.S.C. § 119 to: Indian Patent Application No. 202221061480, filed on Oct. 28, 2022. The entire contents of the aforementioned application are incorporated herein by reference.

TECHNICAL FIELD

The disclosure herein generally relates to industrial manufacturing systems, and, more particularly, to method and system for localization of faults in an industrial manufacturing plant.

BACKGROUND

A typical industrial manufacturing plant may consist of many processes and equipment which in turn consist of components of different shapes and sizes performing various functions. It is important that all these components function properly for efficient working of the plant and to achieve requisite product quality. However, these mechanical components are prone to wear and tear and may eventually malfunction or stop working over a period of time. This adversely affects the performance and the key performance indicators of the plant. As unaddressed faults can hamper normal operation and lead to unplanned downtime, material and productivity loss, adverse impact to equipment, deterioration of product quality, and ultimately loss of revenue, it is important that the faulty component be replaced or repaired at the earliest possible. However, given the large number of components in industrial plants and their interconnected nature, identifying the exact root cause of abnormal or faulty operation is a challenge.

While a multitude of techniques are available for fault detection and classification. there are limited approaches for fault localization and root cause identification, probably due to the challenges associated with modeling the nonlinear interactions among process variables and capturing the nonstationary behavior that is typical of most industrial processes.

SUMMARY

Embodiments of the present disclosure present technological improvements as solutions to one or more of the above-mentioned technical problems recognized by the inventors in conventional systems. For example, in one embodiment, a processor implemented method is provided. In this method, a plurality of multivariate time-series data corresponding to operations of an industrial manufacturing plant are received, via one or more hardware processors, as input data, wherein the plurality of multivariate time-series data comprise information from a plurality of sensors monitoring working of a plurality of components of the industrial manufacturing plant. Further, the input data is pre-processed, via the one or more hardware processors, to generate a pre-processed data. Further, a plurality of soft-sensor data is computed, via the one or more hardware processors, using the pre-processed data, wherein a plurality of soft-sensors corresponding to the computed soft-sensor data includes physics-based soft sensors and data-driven soft sensors.

Further, the pre-processed data is combined with the soft-sensor data to generate a combined plant data, via the one or more hardware processors. Further, a fault analysis is performed, via the one or more hardware processors, on the combined plant data, comprising a) determining whether one or more faults are present in the combined plant data, and b) identifying a fault detection point if the one or more faults are present in the combined plant data. Further, a fault localization is performed, via the one or more hardware processors, to determine one or more variables from the combined plant data having a dominant effect on the one or more faults, if the combined plant data is determined to have the one or more faults. Performing the fault localization comprises applying a multi-level variable perturbation, comprising perturbing one or more of the variables from the combined plant data, to a selected diagnosis model across the fault detection point to calculate a perturbation score corresponding to each of the one or more of the variables, in a plurality of iterations. Further, a contribution score is computed as equal to value of a cumulative perturbation score of the plurality of iterations, and the plurality of variables are sorted in the order of the contribution score. Further, all variables from among the one or more variables, having value of the contribution score below a predetermined percentile, are eliminated to obtain a plurality of candidate variables, wherein the plurality of candidate variables are variables having the dominant effect on the one or more faults. Further, perturbation is performed iteratively on the plurality of candidate variables, a) for a predetermined number of perturbation levels, or b) till a predetermined number of localized variables are obtained.

In another aspect, a system is provided. The system includes one or more hardware processors, a communication interface, and a memory storing a plurality of instructions. The plurality of instructions when executed, cause the one or more hardware processors to receive a plurality of multivariate time-series data corresponding to operations of an industrial manufacturing plant, as input data, wherein the plurality of multivariate time-series comprise information from a plurality of sensors monitor working of a plurality of components of the industrial manufacturing plant. Further, the input data is pre-processed, via the one or more hardware processors, to generate a pre-processed data. Further, a plurality of soft-sensor data is computed, via the one or more hardware processors, using the pre-processed data, wherein a plurality of soft-sensors corresponding to the computed soft-sensor data includes physics-based soft sensors and data-driven soft sensors. Further, the pre-processed data is combined with the soft-sensor data to generate a combined plant data, via the one or more hardware processors. Further, a fault analysis is performed, via the one or more hardware processors, on the combined plant data, comprising a) determining whether one or more faults are present in the combined plant data, and b) identifying a fault detection point if the one or more faults are present in the combined plant data. Further, a fault localization is performed, via the one or more hardware processors, to determine one or more variables from the combined plant data having a dominant effect on the one or more faults, if the combined plant data is determined to have the one or more faults. Performing the fault localization comprises applying a multi-level variable perturbation, comprising perturbing one or more of the variables from the combined plant data, to a selected diagnosis model across the fault detection point to calculate a perturbation score corresponding to each of the one or more of the variables, in a plurality of iterations. Further, a contribution score is computed as equal to value of a cumulative perturbation score of the plurality of iterations, and the plurality of variables are sorted in the order of the contribution score. Further, all variables from among the one or more variables, having value of the contribution score below a predetermined percentile, are eliminated to obtain a plurality of candidate variables, wherein the plurality of candidate variables are variables having the dominant effect on the one or more faults. Further, perturbation is performed iteratively on the plurality of candidate variables, a) for a predetermined number of perturbation levels, or b) till a predetermined number of localized variables are obtained.

In yet another aspect, a non-transitory computer readable medium is provided. The non-transitory computer readable medium includes a plurality of instructions, which when executed, cause one or more hardware processors to perform the following steps. Initially, a plurality of multivariate time-series data corresponding to operations of an industrial manufacturing plant are received, via one or more hardware processors, as input data, wherein the plurality of multivariate time-series data comprise information from a plurality of sensors monitoring working of a plurality of components of the industrial manufacturing plant. Further, the input data is pre-processed, via the one or more hardware processors, to generate a pre-processed data. Further, a plurality of soft-sensor data is computed, via the one or more hardware processors, using the pre-processed data, wherein a plurality of soft-sensors corresponding to the computed soft-sensor data includes physics-based soft sensors and data-driven soft sensors. Further, the pre-processed data is combined with the soft-sensor data to generate a combined plant data, via the one or more hardware processors. Further, a fault analysis is performed, via the one or more hardware processors, on the combined plant data, comprising a) determining whether one or more faults are present in the combined plant data, and b) identifying a fault detection point if the one or more faults are present in the combined plant data. Further, a fault localization is performed, via the one or more hardware processors, to determine one or more variables from the combined plant data having a dominant effect on the one or more faults, if the combined plant data is determined to have the one or more faults. Performing the fault localization comprises applying a multi-level variable perturbation, comprising perturbing one or more of the variables from the combined plant data, to a selected diagnosis model across the fault detection point to calculate a perturbation score corresponding to each of the one or more variables, in a plurality of iterations. Further, a contribution score is computed as equal to value of a cumulative perturbation score of the plurality of iterations, and the plurality of variables are sorted in the order of the contribution score. Further, all variables from among the one or more variables, having value of the contribution score below a predetermined percentile, are eliminated to obtain a plurality of candidate variables, wherein the plurality of candidate variables are variables having the dominant effect on the one or more faults. Further, perturbation is performed iteratively on the plurality of candidate variables, a) for a predetermined number of perturbation levels, or b) till a predetermined number of localized variables are obtained.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2 is a flow diagram depicting steps involved in the process of fault detection and localization, by the system of FIG. 1, according to some embodiments of the present disclosure.

FIG. 3 is a flow diagram depicting steps involved in the process of fault localization, by the system of FIG. 1, according to some embodiments of the present disclosure.

DETAILED DESCRIPTION

Figure 1:
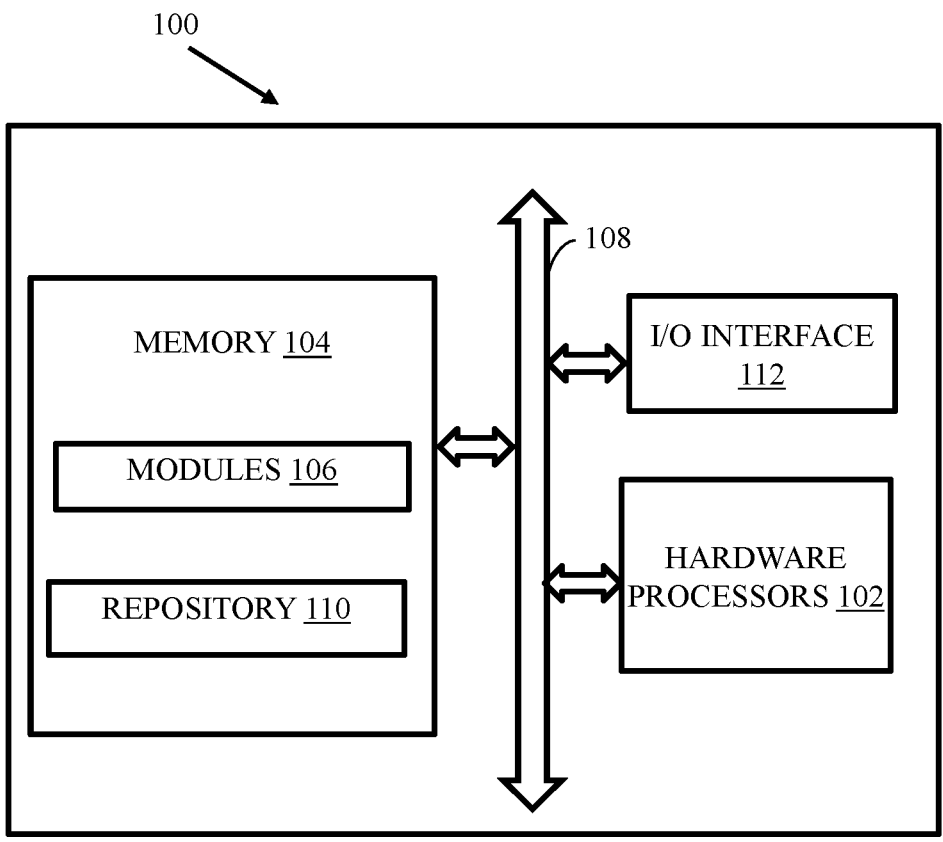
FIG. 1 illustrates an exemplary system for fault detection and localization, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

While a multitude of techniques are available for fault detection and classification, there are limited approaches for fault localization and root cause identification, probably due to the challenges associated with modeling the nonlinear interactions among process variables and capturing the nonstationary behavior that is typical of most industrial processes.

To address this challenge, the embodiments disclosed herein provide a method and system which uses a variable perturbation matrix-based method for fault localization. A variable perturbation matrix (VPM) is obtained by perturbing one or more sensor variables across the fault detection point. For every variable, the cumulative perturbation score is computed by measuring the sensitivity of a data-driven diagnosis model to the sensor variables. The variables with the highest perturbation scores are selected as the variables responsible for the fault.

Referring now to the drawings, and more particularly to FIG. 1 through FIG. 6, where similar reference characters denote corresponding features consistently throughout the figures, there are shown preferred embodiments and these embodiments are described in the context of the following exemplary system and/or method.

FIG. 1 illustrates an exemplary system for fault detection and localization, according to some embodiments of the present disclosure.

The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software interfaces, for example, a web interface, a graphical user interface, and the like. The I/O interface 112 may include a variety of hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 104 includes a plurality of modules 106.

The plurality of modules 106 include programs or coded instructions that supplement applications or functions performed by the system 100 for executing different steps involved in the process of detection and localization of faults, being performed by the system 100. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for the process of identification and localization of faults.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to the steps in flow diagrams in FIG. 2, and FIG. 3, the example graphical representations in FIG. 4 and FIG. 5, and the example implementation in FIG. 6.

Figure 6:
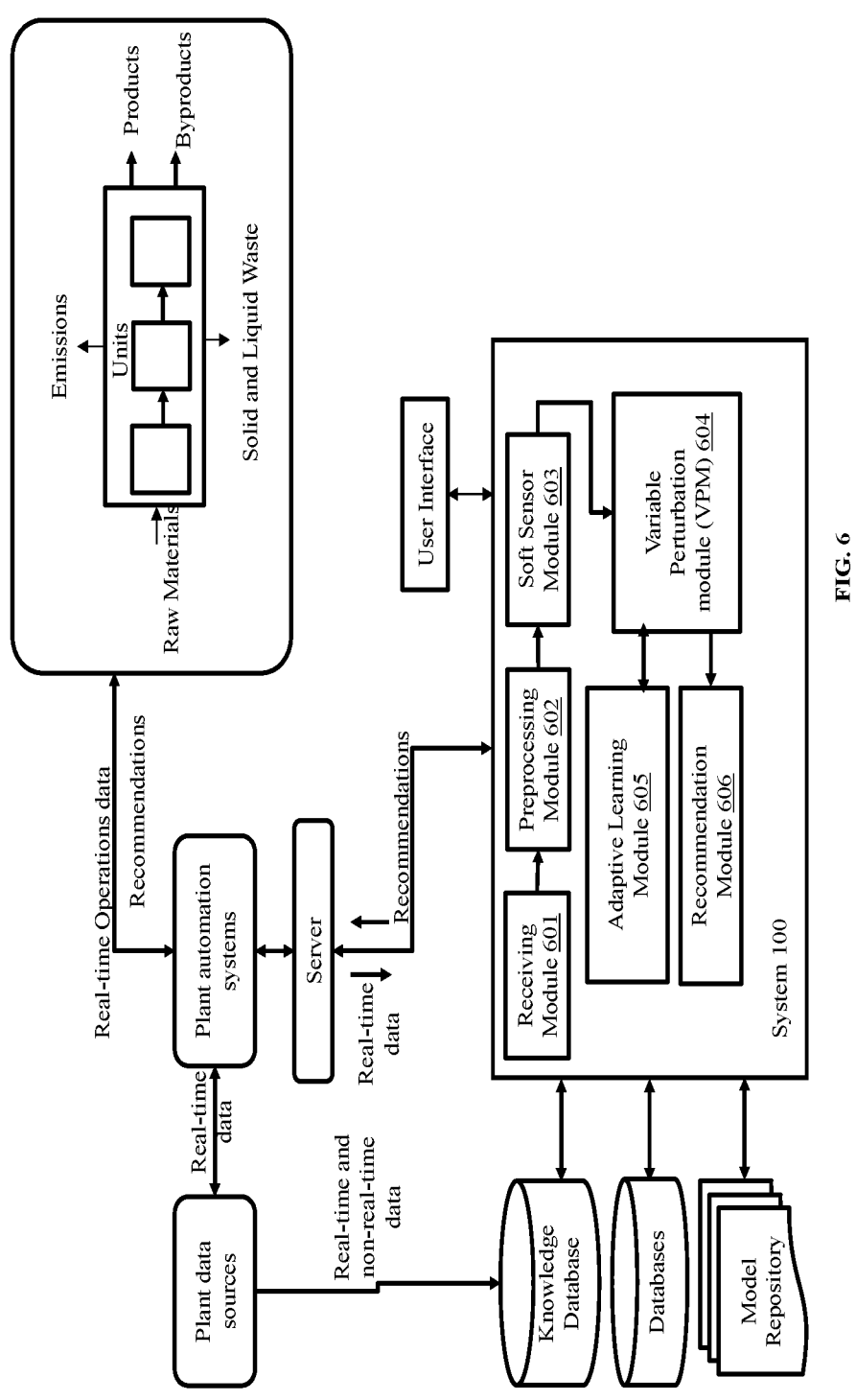
FIG. 6 depicts an example implementation of the system of FIG. 1, for the fault detection and localization, according to some embodiments of the present disclosure.

The example implementation in FIG. 6 depicts the system 100 as comprising a receiving module 601, a preprocessing module 602, a soft sensor module 603, a variable perturbation module 604, an adaptive learning module 605, and a recommendation module 606. The system 100 in FIG. 6 has a model repository comprising a plurality of data models, a database, and a knowledge base associated with it. The system 100 is connected to an industrial system using a suitable interface, and collects real-time operations data as input, which is then processed by the system 100 to generate one or more recommendations, which may be then provided to a user via the user interface. Working of different modules of the system 100 are explained with reference to the methods 200 and 300.

FIG. 2 is a flow diagram depicting steps involved in the process of fault detection and localization, by the system of FIG. 1, according to some embodiments of the present disclosure.

At step 202 of method 200, the system 100 receives, via the receiving module 601 executed by the one or more hardware processors 102, a plurality of multivariate time-series data corresponding to the operation of an industrial manufacturing plant, as input data. The plurality of multivariate time-series data include sensor data, laboratory information, and environment data, with respect to various parameters of the plant that is being monitored. For example, information from a plurality of sensors attached to a plurality of components of the industrial manufacturing plant may include values of various parameters such as but not limited to temperature, pressure, flow rate, concentration, etc. at each instance, or over a period of time, and may be collected as the multivariate time-series data. As the input data may be received in a raw format, it may have to be conditioned for processing further. To condition the input data, at step 204 of the method 200, the system 100 pre-processes, via the preprocessing module 602 executed by the one or more hardware processors 102, the input data using one or more appropriate data processing techniques, to generate a pre-processed data. For example, pre-processing may involve removal of noisy data, imputation of missing values, converting the input data to a pre-defined standard format, synchronizing and merging data from multiple data sources, unifying the data sampling frequency by averaging and/or replication and so on.

There may be practical challenges in monitoring and measuring certain process parameters using physical sensors in any industrial plant. For example, in a furnace that may be part of the industrial plant, fuel may be burning at very high temperatures. As a result, placing a temperature sensor (thermocouple) within the furnace may not be feasible, and even if done, the sensors would malfunction due to exposure to high temperatures. However, if data on all key process parameters isn't obtained, it may hamper the accuracy of process monitoring and fault detection and localization. To address this challenge, at step 206 of the method 200, the system 100 computes, via the soft sensor module 603 executed by the one or more hardware processors 102, a plurality of soft-sensor data using the pre-processed data, wherein a plurality of soft-sensors corresponding to the computed soft-sensor data includes physics-based soft sensors and data-driven or empirical soft sensors.

Further, at step 208 of the method 200, the system 100 combines, via the one or more hardware processors 102, the pre-processed data with the soft-sensor data on the basis of the recorded timestamp to generate a combined plant data.

Further, at step 210 of the method 200, the system 100 performs, via the one or more hardware processors 102, a fault analysis on the combined plant data. Performing the fault analysis includes a) determining whether one or more faults are present in the combined plant data, and b) identifying a fault detection point if the one or more faults are present in the combined plant data. The term 'fault detection point' in the context of the embodiments disclosed herein refers to the time instance at which the signature of each of the determined one or more faults is first detected. The system 100 performs the fault analysis using a fault detection and classification approach, which is detailed below:

Fault detection and localization:—The objective of fault detection and classification is to detect and classify the detected faulty operation into one or more known fault types. The detection and classification models are trained using historical normal and faulty sensor data, via the adaptive learning module 605 executed by the one or more hardware processors 102. In fault detection, sensor data is used to output a fault score for each data instance if the fault score is greater than a predefined threshold, then the instances are labeled as faulty. In fault classification, the faulty instances will be classified to a class having highest probability given by the fault classification model. The system 100 may use one or more statistical and machine learning technique-based models for fault detection and classification. These techniques can be but are not limited to Principal component analysis (PCA), local outlier factor, elliptical envelope, Mahalanobis distance, isolation forest, one-class support vector, K-nearest neighbors and deep learning techniques comprising Multi-layer perceptron (MLP), Long Short Term memory (LSTM) and auto-encoders such as LSTM autoencoder, convolutional neural network autoencoder (CNN-AE), and dense autoencoder. Sequence-based models such as the LSTM network model which capture long term temporal dependencies in time series sequence data may be used for fault detection and localization. In addition to the input i.e. the combined plant data, the LSTM network may also use the previous hidden state information. In an LSTM cell, the flow of information is regulated using input (i), output (o), and forget ($f$) gates. A cell state $c_t$ and hidden state $h_t$ are computed in a recurrent manner as shown in Eq. (1).

$$f_t = \sigma(W_f x_t + U_f h_{t-1} + b_f)$$

$$i_t = \sigma(W_i x_t + U_i h_{t-1} + b_i)$$

$$o_t = \sigma(W_o x_t + U_o h_{t-1} + b_o)$$

$$\widetilde{c}_t = \tanh(W_c x_t + U_c h_{t-1} + b_c)$$

$$c_t = f_t \odot c_{t-1} + i_t \odot \widetilde{c}_t$$

$$h_t = o_t \odot \tanh(c_t) \tag{1}$$

where, $x_t$, $h_t$, $c_t$ are input, hidden and cell state vectors at time t, respectively. $\sigma(\cdot)$ and $\tanh(\cdot)$ are sigmoid and hyperbolic tangent activation functions. W and U are trainable weight parameters of the input and previous hidden connections and b are bias vectors respectively. The gradient descent method is used to determine the optimal values of trainable parameters for minimizing the categorical cross-entropy cost function shown in Eq. (2).

$$\mathcal{L}(y, \hat{y}) = \sum_{l=1}^{c} y_l \log \hat{y}_l \tag{2}$$

where y is the actual fault class, $\hat{y}$ is the predicted fault class and c is the number of fault classes Performing the fault analysis also includes classifying one or more detected faults into one or more known fault classes by a fault classification model used by the system 100. The fault classification model is also a data-driven model which is trained using statistical or machine learning and appropriate historical data and fault information, to classify various faults into one or more fault classes. If the fault classification model fails to classify any detected fault into the one or more known fault classes, then the system 100 may retrain the fault classification model using data from the unclassified fault.

If one or more faults are detected/identified, further, at step 212 of the method 200, the system 100 performs, via the one or more hardware processors 102, a fault localization to determine one or more variables from the combined plant data having a dominant effect on the one or more faults. The system 100 performs the fault localization by using a multi-level variable perturbation approach, which is depicted in method 300 of FIG. 3, and is elaborated below. In the practical implementation, the multi-level variable perturbation being performed at step 212 is executed by the variable perturbation module 604, using one or more of the plurality of fault diagnosis models. At step 302 of the method 300, the system 100 perturbs one or more of the variables from the combined plant data which are input to a selected diagnosis model across the fault detection point to calculate a perturbation score corresponding to each of the one or more of the variables, in a plurality of iterations. In an embodiment, the number of variables perturbed simultaneously at each of the plurality of iterations is equal to the corresponding perturbation level, i.e. for each level of perturbation in the multi-level perturbation approach used, a corresponding number i.e. number of variables, is predefined and configured with the system 100. The perturbation level is a positive integer not exceeding a number of candidate variables from a preceding level from among a plurality of preceding levels, wherein the candidate variables are variables having dominant effect on the one or more faults. The diagnosis model is selected from a plurality of pre-trained diagnosis models based on the fault class into which each of the identified faults has been classified. The system 100 may maintain, in an associated repository, information on one or more diagnosis models matching each of the fault classes. The perturbation score for each of the one or more variables is calculated in each of the plurality of iterations, wherein in each of the plurality of iterations, the perturbation score is obtained as output of the diagnosis model after replacing a faulty data with corresponding normal data for the one or more variables, and the perturbation score represents the change in score when each variable is changed from normal to faulty. Further, at step 304 of the method 300, the system 100 computes a contribution score as equal to value of a cumulative perturbation score of the plurality of iterations, and then sorts the plurality of variables in the order of the contribution score. Further, at step 306 of the method 300, the system 100 eliminates all variables from among the one or more variables, having value of the contribution score below a predetermined percentile, to obtain a plurality of candidate variables, wherein the plurality of candidate variables are variables having the dominant effect on the one or more faults. Value of the pre-determined percentile may be obtained as input from a user, and may be in the range of 40 to 80%. Further, at step 308 of the method 300, the system 100 iteratively performs perturbation on the plurality of candidate variables, a) for a predetermined number of perturbation levels, or b) till a predetermined number of localized variables are obtained. Using this approach, one or more variables having dominant effect on the one or more faults are identified, and information on these identified one or more variables may then be provided as a recommendation to an authorized user, via the recommendation module 606 executed by the one or more hardware processors 102, who may then take appropriate corrective and preventive measures to address the fault and its impact.

The multi-level variable perturbation approach used by the system 100 in method 300 is further explained below.

Figure 4:
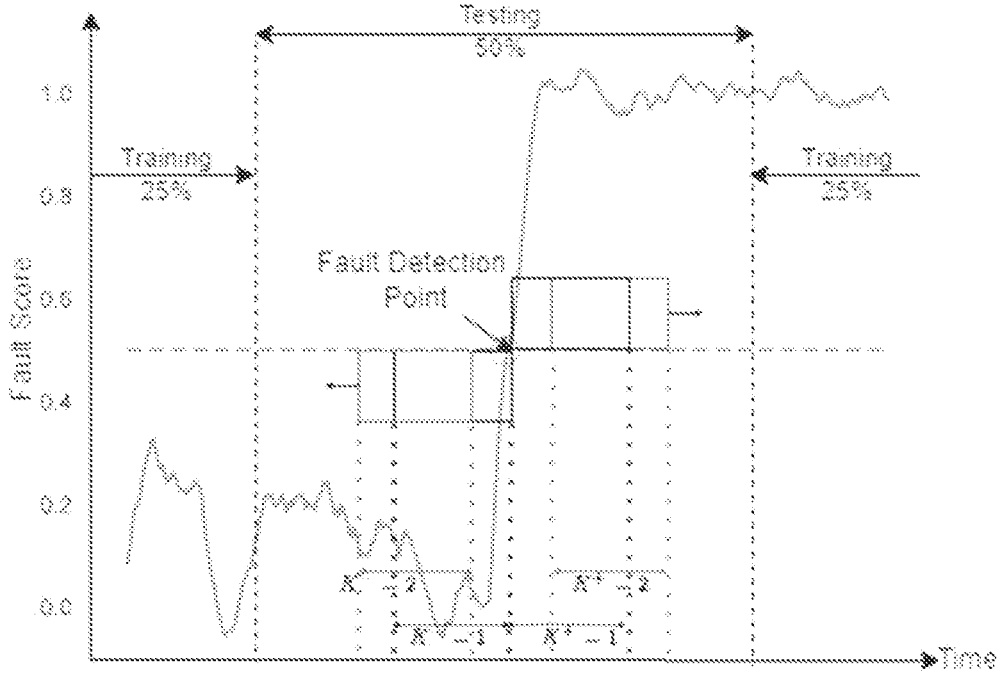
FIG. 4 is an example graphical representation of multi-level variable perturbation by the system of FIG. 1, according to some embodiments of the present disclosure.

In the multi-level variable perturbation approach, the system 100 computes a cumulative change in the score of the plurality of diagnosis models with respect to each variable. The system 100 obtains the value of a cumulative change by summing the perturbation scores from all the iterations wherein in each iteration, the perturbation score is the output of the diagnosis model obtained by replacing the faulty data with the corresponding normal data of the feature in each diagnosis window. This process is explained with reference to the graphical representation in FIG. 4. FIG. 4 illustrates the approach for two iterations where $D_w-$ and $D_w+$ represent diagnosis windows before and after the fault detection point respectively used for variable perturbation. With each iteration, the diagnosis windows on either side of the detection point are moved further away from the detection point as shown in FIG. 4.

Each diagnosis model is trained to fit a fault score (obtained from the fault detection models) across the detection point and is specific to every fault class. The diagnosis model may be a data-driven model (regression model), a mechanistic model, or any other functional approximation. The underlying premise is that the fault score generated by the diagnosis model can be approximated as a sum of nonlinear functions of the process variables and tuneable parameters. Mathematically, the fault score, s is approximated as, $$s = \sum_0^L f_L(x_i, x_j, x_{k,\dots}, \theta_l) \quad \forall L \in N \quad \& \quad \forall i, j, k \in N \tag{3}$$

where, $f_L$ is a nonlinear function, L is the number of nonlinear functions, $\theta_l$ are parameters of the function $f_L$, and $x_i$, $x_j$, $x_k$ are the sensor features/variables.

The nonlinear function (also referred to as 'fault score function') is approximated using multiple machine learning techniques such as random forest, extra gradient boosting, adaptive boosting, extra trees regression, gradient boosting, support vector machine, K-nearest neighbors, MLP, CNN and LSTM. Once a good diagnosis model that has learnt the above functional form and could distinguish faulty operation from normal operation across the detection point is available, a first level variable perturbation matrix across the detection point is calculated across the diagnosis windows of equal length and summed as shown in Eq. (4).

$$J^1(i) = \sum_0^K \frac{\Delta_S}{\Delta_{x_i}} \tag{i}$$

where K is the number of iterations for which perturbation is performed on either side of the fault detection point. Based on the perturbation score, the features are sorted and $f_1$ fraction of variables having a low perturbation score are rejected, wherein value of $f_1$ may be pre-configured or dynamically configured, as per requirements, by an authorized user. The perturbation score, which is a first order perturbation score, is calculated by perturbing one variable at a time around fault detection point. The rest, i.e., $(1-f_1)$ fraction of variables are used to calculate a second level variable perturbation matrix across the detection point over K number of diagnosis windows or iterations as shown in Eq. (5).

$$J^1(i, j) = \sum_0^K \frac{\Delta_S}{\Delta_{x_i}\Delta_{x_j}} \quad \forall i, j \in N, \tag{5}$$

The absolute perturbation score of each variable in the second level perturbation matrix can be calculated by taking the mean around the second dimension (i.e., row mean) of the matrix. The features are sorted once again with respect to the absolute perturbation score and $f_2$ fraction of variables having low score are rejected and the rest $(1-f_2)$ fraction of variables are carried forward. Value of $f_2$ may be pre-configured or dynamically configured, as per requirements, by an authorized user. The system 100 then calculates a third level variable perturbation matrix across K diagnosis windows or iterations as shown in Eq. (6).

$$J^1(i, j, k) = \sum_0^K \frac{\Delta_S}{\Delta_{x_i}\Delta_{x_j}\Delta_{x_k}} \quad \forall i, j, k \in N, \tag{6}$$

The absolute perturbation score of each variable in the third level perturbation matrix can be calculated by taking the mean over the third dimension (matrix mean) of the matrix. The variables are then sorted using the absolute perturbation score values. Similarly, higher order perturbation matrix calculations can be performed to arrive at a smaller number of remaining variables. However, it is observed that the third order perturbation with higher variables rejection percentiles is sufficient to reach a reasonable number (e.g., 5) of remaining variables. Thus, using the variable perturbation matrix-based approach, the system 100 arrives at a set of the variables having the dominant effect on the diagnosis model. These variables are considered to be the most significant variables relevant to the fault.

Experimental Data a. Experimental Setup

The utility of the fault detection and localization method is demonstrated on data obtained from PHME-Data challenge. (2022), and Data Challenge: 2021. Retrieved from https://github.com/PHME-Datachallenge/Data-Challenge-2021 (Original work published 2021). The aim of the challenge was to have a fast and robust predictive maintenance solution for an industrial robotic test bed designed for quality control and assurance. Detecting and classifying the faults accurately and identifying the most significant variables of the faults in the lowest possible time were the key aspects of the challenge. The system of interest was provided by the Swiss Center for Electronic and Microtechnology (CSEM) and used for testing of fuses. The testing system mainly comprises a test bench for fuses and a 4-axis SCARA-robotic vacuum feeder arm to pick up the fuses. The fuse test bench further comprises two conveyor belts, an infrared thermal sensor set up and a robotic sorting bar. The steps in the testing process are as follows:

First, fuses are picked and transported within the range of infrared sensor by the robotic feeder Fuses are first tested for their conductivity and later for their quality by applying a 200 mA current for 1.5 sec and simultaneously measuring their responses After the test, fuses are transported to the main conveyor belt for further sorting Fuses are sorted by the robotic sorting bar based on their test results The fuses are transported by the conveyor belt to the feeder Finally, the fuses are transported by another conveyor belt to the next processing step such as labeling or packing The system is instrumented well to measure the state of its health, the surrounding environment, and other auxiliary systems of the machine. A total of 50 variables related to the system health (pressure, vacuum etc.) and environment conditions (temperature, humidity, etc.) are monitored and their time series features are recorded at 10 sec time intervals. The time series features include the maximum value, minimum value, mean, frequency, total count, and trend of each variable.

Various faults such as conveyor failure due to motor fault or high frictional losses, pneumatics fuse feeder failure due to pressure leakage, robot gripper failure due to vacuum system fault, and other failures due to noisy measurement and desyncing of robotic feeder can occur in the test bed. A total of 6 faulty operating conditions are observed in the system. Accurate detection, classification, and diagnosis of these faults in the shortest possible time is of utmost importance to the test bed operator. This increases the productivity and efficacy of the testing process, minimizes the losses due to false positives, and reduces unnecessary alarms and warnings thus reducing the cognitive load on the operators. Similarly, timely corrective actions will minimize the losses and reduce adverse impact on the health of the test bed.

b. Model Development:

Deep learning models for fault detection & classification and fault diagnosis are developed for the fault analysis and fault localization steps in the method respectively. The models were developed by taking an initial dataset consisting of 50 variables, out of which 17 variables were omitted as they had no variability (zero standard deviation). The remaining 33 variables were considered for building the fault detection & classification, and diagnosis models.

1. Fault Detection and Classification Model

A LSTM classifier is trained for combined fault detection and classification. For training the model, a total of 57000 data points comprising normal instances as well as faulty instances of each fault class are used. 20% of the data is used as the test data for evaluating the model performance and the remaining 80% is used for training the network. The training data is first subjected to data pre-processing, where null values in the data are imputed using multivariate imputation, and the resultant data is normalized using z-score normalization.

The LSTM network comprises 2 hidden layers having tanh activation function followed by an output layer with single cell and sigmoid activation function. The number of cells in the hidden layer, the window size and the batch size are the hyper-parameters which are tuned using GridSearchCV during model training. The number of hidden cells is evaluated at values of 20, 50, 100 and 200. Considering the data size and dynamics of the system, window sizes are evaluated at values of 5, 10, 15 and 20, and the batch size is evaluated at values of 16, 32, 48 and 64. The model is trained for a maximum of 150 epochs. The categorical cross entropy between actual and predicted labels is computed after each epoch and early stopping with a patience of 5 is used to prevent overfitting. The optimal values of hyper-parameters obtained for the trained model are 100 LSTM cells in both the hidden layers, a window size of 5 and a batch size of 16.

The developed LSTM model had an average fault classification accuracy of 98.92% across all faults.

2. Fault Diagnosis Model

For the fault diagnosis model, various ML techniques such as Random Forest and XGBoost, and DL techniques such as LSTM are experimented with. These techniques are shortlisted based on their capability to learn nonlinear behavior and sensitivity to faults. The diagnosis model is trained as a regression model to fit the fault (probability) score from the fault detection & classification model around the detection point. Therefore, one diagnosis model is trained for each fault class.

For each fault class, multiple files of faulty operation data are provided. These are utilized for training and validating the diagnosis models. In each file, the initial portion consisted of data from normal operation of the test bed while the end portion consisted of data from faulty operation, and the transition point from normal to faulty operation was anywhere in the middle. The train-test split approach considered for the diagnosis models is different from the commonly used random split approach. 25% of the instances from each extreme end of the data are selected for training and the points across the detection points are used for validation. Once the diagnosis models are built, their validation is done by applying the (Multi-level Variable Perturbation Matrix) MVPM approach on the validation data. The most significant variables obtained from MVPM are then compared with the ground truth variables available for each fault class. Validation is performed by ascertaining the consistency of the most significant variable groups identified for each fault class, reproducibility of the results on data files of the same fault class, and differences in the variables shortlisted across different fault classes.

Based on these validation criteria, LSTM diagnosis models were found to perform better than models built using other techniques, possibly due to better learning of the evolving fault signature. Thus, LSTM models are finalized for fault diagnosis. For each fault class, a separate LSTM diagnosis model is built for better specificity of the results.

The ranges of optimal parameters of the LSTM models obtained after hyper-parameter tuning and the optimal MVPM approach parameters, perturbation window length and rejection percentile are tabulated in Table 1.

TABLE 1

| Parameter | Optimal value |
| --- | --- |
| Number of hidden layers | 2 |
| Number of cells | 64 to 256 |

TABLE 1-continued

| Parameter | Optimal value |
|---|---|
| Batch size | 32 |
| Window size | 15 |
| Activation function | ReLU |
| Epochs | 120 |
| Rejection percentiles ($f_1$, $f_2$, $f_3$) | 0.5 |
| Perturbation window length | 8 to 10 | c. Results

Figure 5:
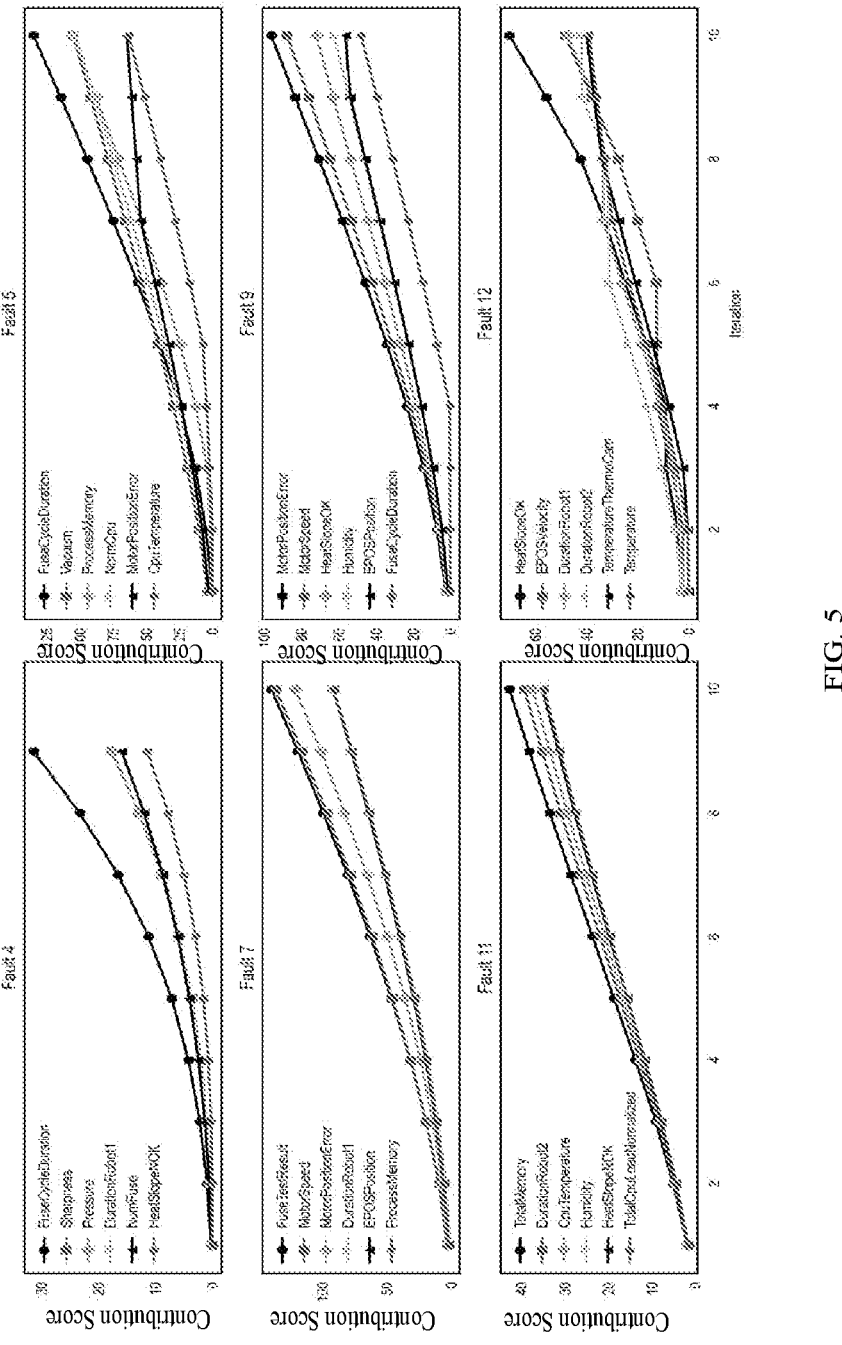
FIG. 5 depicts example graphs depicting contribution scores of variables for a plurality of fault classes, according to some embodiments of the present disclosure.

The ground truth in terms of key variables pertaining to fault classes 4, 5, 7, 9, 11 and 12 in the test bed was provided by organizers of the PHME-21 data challenge and was used to verify the effectiveness of the method 200. The trained LSTM model for fault detection and classification was used to detect and classify the faults. The LSTM fault diagnosis model specific to the detected fault was then used to compute the contribution score. For each of the 6 fault classes, the variables were ranked in decreasing order of the contribution score. The trend of contribution score for the significant variables across the iterations for each fault class are shown in FIG. 5. It can be observed that for almost all fault classes, the contribution score trend for the most significant variables separates from that of the rest of the variables indicating the effect of dominant variables on the fault.

The top 3 most significant variables identified for each fault class were compared with the corresponding ground truth variables and are shown in Table 2. The diagnosis accuracy of the approach is computed using the most significant variables for each fault class as:

$$\text{Diagnostic Accuracy} = \begin{cases} 1 - 0.15(X-1), & \text{if } x < 4 \\ 0.5 & \text{otherwise} \end{cases}$$

where, x is the position of the ground truth variable in the list of most significant variables. The diagnosis accuracy for each fault class is also shown in Table 2.

Table 2 shows that the most significant variables are correctly diagnosed for faults 4, 5, 9 and 12 with a high degree of accuracy. For fault class 4, the ground truth variable, 'Pressure' is identified correctly by the approach as the third most significant variable for the fault. For fault class 5 too, the ground truth variable, 'Vacuum' is correctly identified along with two other variables 'FuseCycleDuration' and 'ProcessMemory'. The ground truth variable is identified second in the order of significance. For fault class 9, there is a good match between the ground truth variables and the diagnosed variables. The contribution score for 'MotorPositionError' and 'MotorSpeed' separated from the score of the rest of variables as the number of iterations increased. The identified variables imply the error is caused due to variation in motor speed of conveyor belt. Similarly, for fault class 12, the ground truth variables match well with those identified by the approach. FIG. 5 also shows that the signals representing robot arm duration, i.e., 'DurationRobot2' and 'DurationRobot1' had higher perturbation scores till iteration #6 indicating that the fault lies in the robot arm that is picking fuses from the feeder to the test bench and returning them after the test.

For fault class 7, however, the identified significant variables, 'FuseTestResult', 'MotorSpeed' and 'MotorPositionError' do not match directly with the ground truth variables i.e., 'Vacuum'. For class 11 too, the ground truth variables i.e., 'MotorSpeed' and 'MotorPositionError' do not match with the diagnosed variables. In the case of class 11, however, the variable 'MotorSpeed' is constant throughout the operation and therefore cannot be the correct ground truth variable for the fault. The most significant variables identified for this fault class are 'TotalMemory', 'DurationRobot2' and 'CpuTemperature'. These variables point to a possible fault in the robot arm causing an increasing load on the processor.

The average diagnosis accuracy for all fault classes combined was found to be ~70.8% when the top 3 features were considered. For only those fault classes where the significant variables were correctly identified, i.e., fault classes 4, 5, 9 and 12, the diagnosis accuracy was ~81.2%. The diagnosis accuracy from the method 200 was found to be either on par or better than that reported by some of the state-of-the-art approaches with which performance of the method 200 was compared.

TABLE 2

| Fault class | Ground truth variables | Most significant variables identified by method 200 | Diagnosis accuracy |
|---|---|---|---|
| 4 | Pressure | FuseCycleDuration SharpnessImage Pressure | 0.7 |
| 5 | Vaccum | FuseCycleDuration Vaccum ProcessMemory | 0.85 |
| 7 | Vaccum | Fuse TestResult MotorSpeed MotorPositionError | 0.5 |
| 9 | MotorSpeed MotorpositionError | MotorPositionError MotorSpeed HeatSlopeOK | 1 |
| 11 | MotorSpeed MotorPositionError | Totalmemory DurationRobot2 CpuTemperature | 0.5 |
| 12 | DurationRobot2 DurationRobot1 | HeatSlopeOK EPOSVelocity DurationRobot2 DurationRobot1 | 0.7 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiment of present disclosure herein addresses unresolved problem of fault detection and localization faults in an industrial plant. The embodiment, thus provides a perturbation based approach for fault localization. Moreover, the embodiments herein further provide an approach for identification of root causes of faults, by means of the fault localization approach.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
receiving, via one or more hardware processors, a plurality of multivariate time-series data corresponding to operations of an industrial manufacturing plant, as input data, wherein the plurality of multivariate time-series data comprise information from a plurality of sensors monitoring working of a plurality of components of the industrial manufacturing plant;

pre-processing, via the one or more hardware processors, the input data to generate a pre-processed data;

computing, via the one or more hardware processors, a plurality of soft-sensor data using the pre-processed data, wherein a plurality of soft-sensors corresponding to the computed soft-sensor data includes physics-based soft sensors and data-driven soft sensors;

combining, via the one or more hardware processors, the pre-processed data with the plurality of soft-sensor data to generate a combined plant data;

performing, via the one or more hardware processors, a fault analysis on the combined plant data, comprising a) determining whether one or more faults are present in the combined plant data, and b) identifying a fault detection point if the one or more faults are present in the combined plant data; and performing, via the one or more hardware processors, a fault localization to determine one or more variables from the combined plant data having a dominant effect on the one or more faults, if the combined plant data is determined to have the one or more faults, wherein performing, the fault localization comprises applying a multi-level variable perturbation, comprising:

perturbing one or more of the variables from the combined plant data, input to a selected diagnosis model across the fault detection point to calculate a perturbation score corresponding to each of the one or more of the variables, in a plurality of iterations;

computing a contribution score as equal to value of a cumulative perturbation score of the plurality of iterations, and sorting the plurality of variables in the order of the contribution score;

eliminating all variables from among the one or more variables, having value of the contribution score below a predetermined percentile, to obtain a plurality of candidate variables, wherein the plurality of candidate variables are variables having the dominant effect on the one or more faults; and iteratively performing perturbation on the plurality of candidate variables, a) for a predetermined number of perturbation levels, or b) till a predetermined number of localized variables are obtained.

2. The method of claim 1, wherein the perturbation score for each of the one or more variables is calculated in each of the plurality of iterations, wherein in each of the plurality of iterations, the perturbation score is obtained as output of the diagnostic model after replacing a faulty data with corresponding normal data for the one or more variables.

3. The method of claim 1, wherein performing the fault analysis comprises classifying one or more detected faults into one or more known fault classes by a fault classification model, wherein, the fault classification model is retrained if failed to classify any detected fault into the one or more known fault classes.

4. The method of claim 1, wherein the diagnosis model is selected from among a plurality of pre-trained diagnosis models for the one or more fault classes the one or more detected faults are classified into.

5. The method of claim 1, wherein the plurality of multivariate time-series data comprise a plurality of sensor data, laboratory information, and environment data.

6. The method of claim 1, wherein the number of variables perturbed simultaneously at each of the plurality of iterations is equal to the corresponding perturbation level.

7. The method of claim 1, wherein the perturbation level is a positive integer not exceeding number of candidate variables from a preceding level from among a plurality of preceding levels.

8. The method of claim 1, wherein the fault detection point is a time instance of occurrence of the fault.

9. A system, comprising:
one or more hardware processors;
a communication interface; and
a memory storing a plurality of instructions, wherein the plurality of instructions when executed, cause the one or more hardware processors to:
receive a plurality of multivariate time-series data corresponding to operations of an industrial manufacturing plant, as input data, wherein the plurality of multivariate time-series comprise information from a plurality of sensors monitor working of a plurality of components of the industrial manufacturing plant;
pre-process the input data to generate a pre-processed data;
compute a plurality of soft-sensor data using the pre-processed data, wherein a plurality of soft-sensors corresponding to the computed soft-sensor data includes physics-based soft sensors and data-driven soft sensors;
combine the pre-processed data with the plurality of soft-sensor data to generate a combined plant data;
perform a fault analysis on the combined plant data, by a) determining whether one or more faults are present in the combined plant data, and b) identifying a fault detection point if the one or more faults are present in the combined plant data; and
perform a fault localization to determine one or more variables from the combined plant data having a dominant effect on the one or more faults, if the combined plant data is determined to have the one or more faults, wherein performing, the fault localization comprises applying a multi-level variable perturbation, by:
perturbing one or more of the variables from the combined plant data, input to a selected diagnosis model across the fault detection point to calculate a perturbation score corresponding to each of the one or more of the variables, in a plurality of iterations;
computing a contribution score as equal to value of a cumulative perturbation score of the plurality of iterations, and sorting the plurality of variables in the order of the contribution score;
eliminating all variables from among the one or more variables, having value of the contribution score below a predetermined percentile, to obtain a plurality of candidate variables, wherein the plurality of candidate variables are variables having the dominant effect on the one or more faults; and
iteratively performing perturbation on the plurality of candidate variables, a) for a predetermined number of perturbation levels, or b) till a predetermined number of localized variables are obtained.

10. The system of claim 9, wherein the one or more hardware processors are configured to calculate the perturbation score for each of the one or more variables in each of the plurality of iterations, wherein in each of the plurality of iterations, the perturbation score is obtained as output of the diagnostic model after replacing a faulty data with corresponding normal data for the one or more variables.

11. The system of claim 9, wherein the one or more hardware processors are configured to perform the fault analysis by classifying one or more detected faults into one or more known fault classes by a fault classification model, wherein, the fault classification model is retrained if failed to classify any detected fault into the one or more known fault classes.

12. The system of claim 9, wherein the one or more hardware processors are configured to select the diagnosis model from among a plurality of pre-trained diagnosis models for the one or more fault classes the one or more detected faults are classified into.

13. The system of claim 9, wherein the plurality of multivariate time-series data comprise a plurality of sensor data, laboratory information, and environment data.

14. The system of claim 9, wherein the number of variables perturbed simultaneously at each of the plurality of iterations is equal to the corresponding perturbation level.

15. The system of claim 9, wherein the perturbation level is a positive integer not exceeding number of candidate variables from a preceding level from among a plurality of preceding levels.

16. The system of claim 9, wherein the fault detection point is a time instance of occurrence of the fault.

17. One or more non-transitory machine-readable information storage mediums comprising one or more instructions which when executed by one or more hardware processors cause:
receiving a plurality of multivariate time-series data corresponding to operations of an industrial manufacturing plant, as input data, wherein the plurality of multivariate time-series data comprise information from a plurality of sensors monitoring working of a plurality of components of the industrial manufacturing plant;
pre-processing the input data to generate a pre-processed data;
computing a plurality of soft-sensor data using the pre-processed data, wherein a plurality of soft-sensors corresponding to the computed soft-sensor data includes physics-based soft sensors and data-driven soft sensors;
combining the pre-processed data with the plurality of soft-sensor data to generate a combined plant data;
performing a fault analysis on the combined plant data, comprising a) determining whether one or more faults are present in the combined plant data, and b) identifying a fault detection point if the one or more faults are present in the combined plant data; and
performing a fault localization to determine one or more variables from the combined plant data having a dominant effect on the one or more faults, if the combined plant data is determined to have the one or more faults, wherein performing, the fault localization comprises applying a multi-level variable perturbation, comprising:
perturbing one or more of the variables from the combined plant data, input to a selected diagnosis model across the fault detection point to calculate a perturbation score corresponding to each of the one or more of the variables, in a plurality of iterations;
computing a contribution score as equal to value of a cumulative perturbation score of the plurality of iterations, and sorting the plurality of variables in the order of the contribution score;

eliminating all variables from among the one or more variables, having value of the contribution score below a predetermined percentile, to obtain a plurality of candidate variables, wherein the plurality of candidate variables are variables having the dominant effect on the one or more faults; and iteratively performing perturbation on the plurality of candidate variables, a) for a predetermined number of perturbation levels, or b) till a predetermined number of localized variables are obtained.

18. The one or more non-transitory machine-readable information storage mediums of claim 17, wherein the perturbation score for each of the one or more variables is calculated in each of the plurality of iterations, wherein in each of the plurality of iterations, the perturbation score is obtained as output of the diagnostic model after replacing a faulty data with corresponding normal data for the one or more variables.

19. The one or more non-transitory machine-readable information storage mediums of claim 17, wherein performing the fault analysis comprises classifying one or more detected faults into one or more known fault classes by a fault classification model, wherein, the fault classification model is retrained if failed to classify any detected fault into the one or more known fault classes.

20. The one or more non-transitory machine-readable information storage mediums of claim 17, wherein the diagnosis model is selected from among a plurality of pre-trained diagnosis models for the one or more fault classes the one or more detected faults are classified into.

* * * * *